Figure 1:
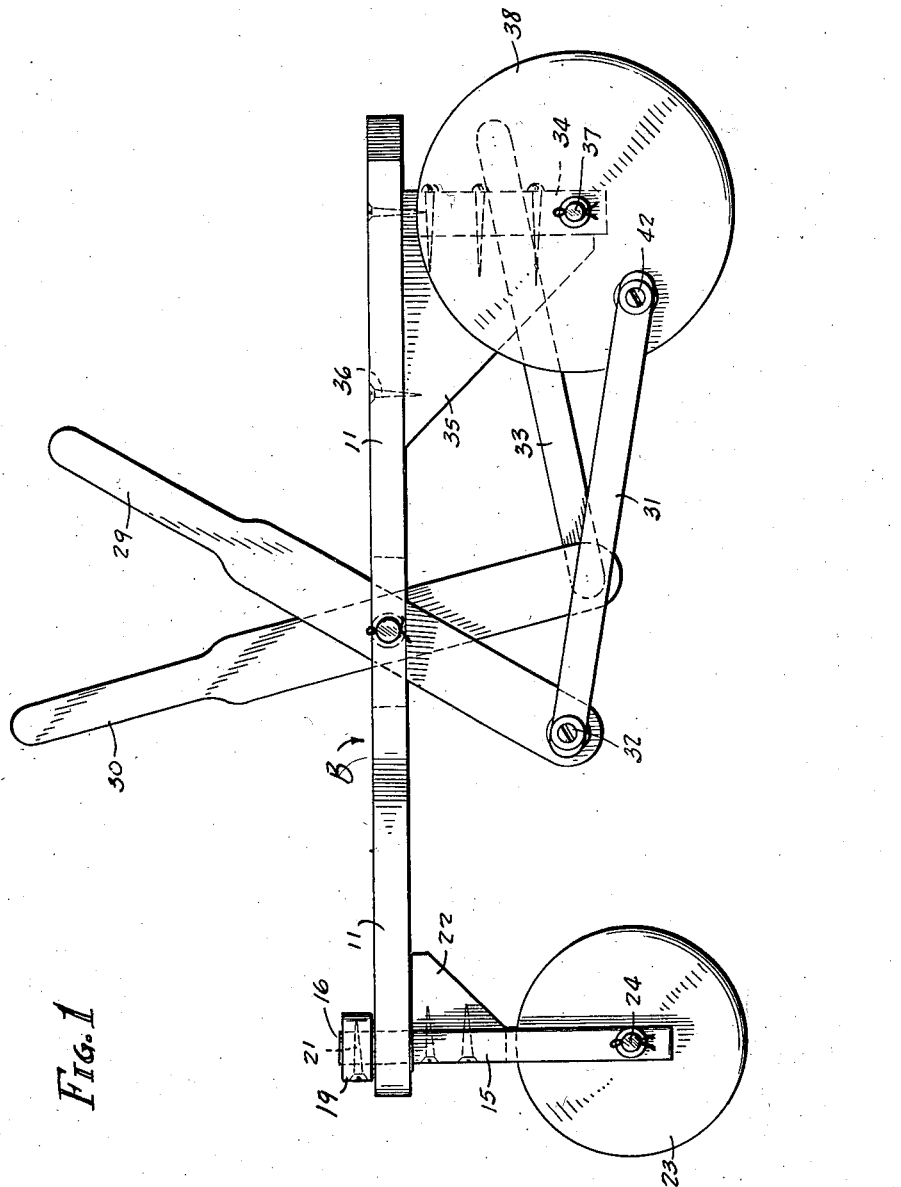

Feb. 20, 1945.   W. C. AUPPERLE   2,369,934
KIDDY CAR
Filed April 3, 1944   2 Sheets-Sheet 1

INVENTOR.
WILLIAM C. AUPPERLE
BY
HIS ATTORNEY

Feb. 20, 1945. W. C. AUPPERLE 2,369,934
KIDDY CAR
Filed April 3, 1944 2 Sheets-Sheet 2
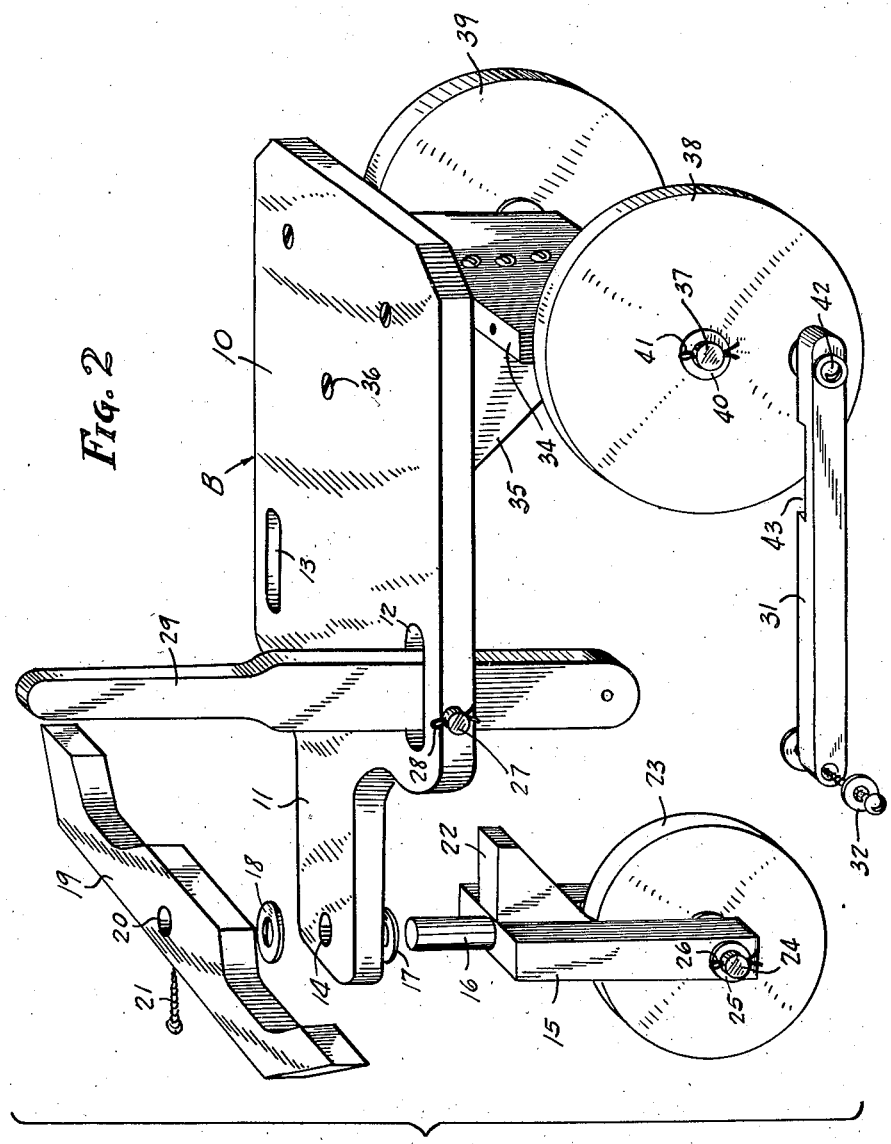
INVENTOR.
WILLIAM C. AUPPERLE.
BY
HIS ATTORNEY Patented Feb. 20, 1945

2,369,934

UNITED STATES PATENT OFFICE 2,369,934

KIDDY CAR

William C. Aupperle, Runnemede, N. J.

Application April 3, 1944, Serial No. 529,362

1 Claim. (Cl. 280—244)

The present invention deals with manually propelled toys and is concerned primarily with those which are hand actuated.

Heretofore, there has been available on the market toy vehicles of the type commonly known as "Irish mails," which operate on the broad principle of transmitting power from a hand actuated lever at the front to the rear driving wheels. However, with the known toy vehicles of this type, gear wheels, or comparable metal parts, are essential requirements; and, with the advent of the present world war, metals are not available for the production of such articles.

Accordingly, this invention has in view, as its foremost objective, the provision of a manually propelled vehicle of the character aforesaid, which may be made almost entirely of wood, and thus be adapted to present-day manufacture.

In carrying out this idea, the invention proposes a vehicle including a pair of rear driving wheels both of which are made from wood. These wheels are mounted on an axle that is carried by the vehicle body, and an important feature of the invention lies in the novel means provided for driving these rear wheels.

In accordance with this invention, a pitman is adapted to each wheel and has its free end connected to the lower end of a lever which is pivotally mounted in the vehicle body. The use of a pair of driving levers of this type is particularly important in that definite assurance is had that both wheels may not, at the same time, be "off-center." This may be achieved by properly staggering the pitman connections.

Yet another object of the invention is the provision of a vehicle of the character aforesaid which is of the tricycle type. That is, a single wheel in front is employed for the steering and is preferably under control of the feet of the operator.

Various other more detailed objects and advantages of the invention, such as arise in connection with carrying out the above noted thoughts in a practical embodiment, will in part become apparent and in part be hereinafter stated, as a description of the invention proceeds.

The invention, therefore, comprises a manually propelled vehicle made substantially completely of wood, which includes a pair of rear driving wheels which are individually driven by pitman connections that are offset with respect to each other.

For a full and more complete understanding of the invention, reference may be had to the following description and accompanying drawings, wherein:

Figure 1 is a view in side elevation of a toy made in accordance with the precepts of this invention; and Figure 2 is a side view showing the several parts entering into the vehicle construction in exploded relation.

Referring now to the drawings wherein like reference characters denote corresponding parts, and first more particularly to Figure 2, the vehicle is shown as comprising a main body part referred to in its entirety by the reference character B. The body B includes a seat portion 10 designed to carry the operator and a forwardly extending tongue 11. Adjacent the side edges and near the front of the seat portion 10, the latter is formed with a pair of slots 12 and 13. The free end of the tongue 11 is formed with a bearing opening 14.

A bifurcated or fork-shaped wheel carrier is shown at 15 and carries a cylindrical post 16 that projects through the bearing opening 14. A fibre washer 17 is interposed between the lower face of the tongue 11 and the upper surface of the fork 15, and another fibre washer 18 is positioned over the post 16 on the upper face of the tongue 11. A steering bar 19 is anchored to the post 16 above the washer 18 by the opening 20, which receives the post 16 and a fastening element such as the screw shown at 21. Additional support for the fork wheel carrier 15 is provided in the form of a bracket member 22 which bears against the underface of the tongue 11.

The wheel 23 of wood is carried by the fork 15, mounting being achieved by an axle 24 which passes through aligned openings in the fork 15 and wheel 23. Fibre washers shown at 25 may be positioned on each side of each leg of the fork, and cotterpins, such as indicated at 26, maintain the assembled relation.

Extending across each of the slots 12 and 13 is a shaft member 27. Cotterpins, shown at 28, may be employed to hold the shaft 27 in position. One hand lever 29 is pivotally mounted on the shaft 27 in the slot 12, and another hand lever 30 is pivotally mounted on the shaft 27 in the slot 13.

Referring now more particularly to Figure 1, wherein the hand levers 29 and 30 are illustrated, it will be noted that a pitman 31 has one end pivotally connected to the lower end of the lever 29 as by the pin and washer assembly shown at 32, while a second pitman 33 has one end similarly connected to the lower end of the hand lever 30.

Referring again to Figure 2, it will be noted that an axle carrier 34 depends from the lower face of the seat portion 10 and is strengthened and made more rigid by the supporting member 35. Screw fastening elements, such as indicated at 36, may be employed to assemble the parts 34 and 35 together and on the seat portion 10 of the body B.

A rear axle 37 is carried by the carrier 34, and this axle 37, in turn, has rotatably mounted thereon a pair of rear driving wheels 38 and 39. There is a fibre washer 40 on each side of each driving wheel, and cotterpins 41 maintain the assembled relation of the driving wheels on the axle.

The rear end of the pitman 31 is pivotally connected to the driving wheel 38 in off-center relation with respect to the axle 37, the pivotal connection being depicted at 42. Likewise, the pitman 33 has its rear end pivotally connected to the driving wheel 39 with the pivotal connection offset with respect to the axle 37. It is important to note that each of the pitmans 31 and 33 is cut away, as shown at 43 in Figure 2, to provide clearances for the extremities of the axle 37 as the pitmans are operated.

From the foregoing, it is apparent that, with the exception of a few fastening elements and perhaps the rear axle, the entire vehicle may be made from wood and fibre washers. Moreover, the pitmans 31 and 33 are so connected to the driving wheels 38 and 39 in staggered relation, so as to make it impossible for both wheels, at the same time, to assume a dead center position.

In operation, the user of the vehicle employs both hands to perform the driving operations, while the feet are employed for steering purposes.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claim.

What is claimed is:

In a wooden vehicle of the character described, a main body having seat and tongue portions, the front part of said seat portion being formed with a pair of closed slots, there being a slot at each side of said seat portion a foot operated steering wheel being carried by said tongue portion, a pair of rear driving wheels carried by said seat portion, a wooden shaft in each of said slots, a pair of hand levers pivotally mounted on said shafts in said slots, and a pair of pitmans operatively connecting the lower extremities of said hand levers to said driving wheels.

WILLIAM C. AUPPERLE.